United States Patent
Masuda et al.

(10) Patent No.: US 6,907,732 B2
(45) Date of Patent: Jun. 21, 2005

(54) MASTER CYLINDER DEVICE FOR BRAKE

(75) Inventors: Yoshihiro Masuda, Kobe (JP); Koji Inoue, Chiisagata-gun (JP)

(73) Assignee: Kawasaki Jukogyo Kabushiki Kaisha

( * ) Notice: Subject to any disclaimer, the term of this patent is extended or adjusted under 35 U.S.C. 154(b) by 52 days.

(21) Appl. No.: 10/407,581

(22) Filed: Apr. 3, 2003

(65) Prior Publication Data

US 2003/0213666 A1 Nov. 20, 2003

(30) Foreign Application Priority Data

Apr. 5, 2002 (JP) ........................................ 2002-103419

(51) Int. Cl.[7] .............................................. B60T 11/26
(52) U.S. Cl. ......................................................... 60/585
(58) Field of Search ................................... 60/585, 534

(56) References Cited

U.S. PATENT DOCUMENTS

| | | | | | |
|---|---|---|---|---|---|
| 3,247,670 | A | * | 4/1966 | Bauman | 60/585 |
| 4,363,240 | A | * | 12/1982 | Mizusaki | 73/334 |
| 4,813,236 | A | * | 3/1989 | Reynolds | 60/585 |
| 4,823,553 | A | * | 4/1989 | Reynolds | 60/585 |
| 4,924,673 | A | * | 5/1990 | Barker et al. | 60/585 |
| 6,336,328 | B1 | * | 1/2002 | Inami et al. | 60/585 |

FOREIGN PATENT DOCUMENTS

| | | |
|---|---|---|
| JP | 3-2962 | 1/1991 |
| JP | 2545224 | 7/1996 |
| JP | 10-236374 | 9/1998 |
| JP | 2000-255409 | 9/2000 |

* cited by examiner

*Primary Examiner*—Edward K. Look
*Assistant Examiner*—Michael Leslie
(74) *Attorney, Agent, or Firm*—Alleman Hall McCoy Russell & Tuttle LLP

(57) ABSTRACT

A master cylinder device for a brake comprise a master cylinder body having a cylinder bore, a reserve tank provided integrally with the master cylinder body so as to have a fluid reserving portion for feeding hydraulic fluid for the brake, a fluid passing port provided in the fluid reserving portion of the reserve tank, the fluid passing port having an opening area smaller than an opening cross-sectional area of the fluid reserving portion, and a communicating passage connecting the fluid passing port to the cylinder bore, wherein the reserve tank is provided on an upper end of the master cylinder device such that a longitudinal direction of the reserve tank is substantially orthogonal to a longitudinal axis of the master cylinder body.

12 Claims, 4 Drawing Sheets

MASTER CYLINDER DEVICE FOR BRAKE

BACKGROUND OF THE INVENTION

1. Field of the Invention

The present invention relates to a master cylinder device for a brake, which is equipped in a vehicle such as a motorcycle or an automobile. More particularly, the present invention relates to a master cylinder device for a brake which is capable of increasing an operation force to smoothly open and close a caliper that seizes a disc rotor with brake pads.

2. Description of the Related Art

In general, a master cylinder device for a rear brake of a motorcycle is comprised of a reserve tank for feeding hydraulic fluid and a master cylinder body which are independently provided and connected to each other through a rubber brake hose. Japanese Patent No. 2545224 describes such prior art.

As disclosed in Japanese Utility Model Application Publication No. Hei. 3-2962 or Japanese Laid-Open Patent Application Publication No. Hei. 10-236374, a master cylinder device for a front brake is configured such that a reserve tank is provided integrally with an upper portion of a master cylinder body that is laterally elongate, and a piston inside the master cylinder body is horizontally movable by a brake lever operated by a driver. The master cylinder body and the brake lever are mounted horizontally to a handle bar.

Japanese Laid-Open Patent Application Publication No. 2000-255409 discloses another prior art master cylinder device. In this master cylinder device, a longitudinally elongate reserve tank for feeding hydraulic fluid for a brake is provided integrally with a master cylinder body and placed such that its longitudinal axis is substantially parallel to a longitudinal axis of the master cylinder body. Inside the reserve tank, a longitudinally elongate bag-shaped diaphragm, and a fluid separator having a plurality of small-hole passages, are provided. The diaphragm communicates with ambient side and is expanded/contracted according to a pressuring force inside the reserve tank.

SUMMARY OF THE INVENTION

However, the master cylinder devices disclosed in the above mentioned publications have the following problems to be solved.

In the master cylinder device disclosed in Japanese Patent No. 2545224 in which the master cylinder body and the reserve tank are connected to each other through the rubber brake hose, the number of components is large and the master cylinder body and the reserve tank are mounted at different positions of the vehicle body. Thus, the device is not compact and requires a large mounting space.

In the case where the master cylinder device for the front brake disclosed in Japanese Utility Model Application Publication No. Hei. 3-2962 is applied to a rear brake, in order to achieve compactness and space saving by mounting the device vertically onto the vehicle body, it is necessary to change a basic structure of the device, for example, by changing a position of a hydraulic fluid inlet located on a side portion of the master cylinder body into an upper end thereof.

While the master cylinder device disclosed in Japanese Patent Application Publication No. 2000-255409 is compact in structure and is space saving, the diaphragm mounted inside the cylindrical, longitudinally elongate reserve tank needs to be a longitudinally elongate bag shape, so as to conform in shape to the reserve tank. In addition, a fluid separator having a plurality of small holes needs to be provided to prevent bubbles, generated due to oscillation or the like during vehicle travel, from going into the master cylinder body. This results in a complex internal structure. In addition, while the device has a substantially cylindrical reservoir, the diaphragm is integral with the fluid separator. For this reason, the diaphragm is incapable of being smoothly deformed so as to conform to variation in the amount of the fluid inside the reservoir due to fluid resistance arising from the fluid separator.

The present invention addresses the above-described problem, and an object of the present invention is to provide a master cylinder device for a brake, which is suitably applied to a brake of a motorcycle, by achieving space saving with fewer components.

According to the present invention, there is provided a master cylinder device for a brake comprising: a master cylinder body having a cylinder bore; a reserve tank provided integrally with the master cylinder body so as to have a fluid reserving portion for feeding hydraulic fluid for the brake; a fluid passing port provided in the fluid reserving portion of the reserve tank, the fluid passing port having an opening area smaller than an opening cross-sectional area of the fluid reserving portion; and a communicating passage connecting the fluid passing port to the cylinder bore, wherein the reserve tank is provided on an upper end of the master cylinder device such that a longitudinal direction of the reserve tank is substantially orthogonal to a longitudinal axis of the master cylinder body.

Preferably, the fluid reserving portion may be rectangular and a fluid passing port may be provided in a bottom face of the fluid reserving portion, i.e., bottom face of an inner wall of the reserve tank.

In the master cylinder device having the above structure, since the master cylinder body and the reserve tank are integral with each other, the master cylinder device is compact in structure and offers space saving with fewer components. Also, the master cylinder device is mounted such that the longitudinal direction of the reserve tank corresponds with the longitudinal direction of the vehicle body together with the master cylinder body. Therefore, mounting space can be reduced, and the volume of the reserve tank can be easily changed by varying the depth of the tank. Further, since the opening cross-sectional area of the fluid passing port at the bottom face of the reserve tank is greatly restricted, bubbles generated inside the reserve tank due to oscillation cannot easily flow into the communicating passage through the fluid passing port, and hence cannot easily flow into the master cylinder body through the communicating passage. In particular, by reducing both the diameter of the fluid passing port and the diameter of the communicating passage, entry of the bubbles into the communicating passage is prevented more effectively.

Preferably, the communicating passage may be provided integrally with the master cylinder body and the reserve tank. By doing so, the whole master cylinder device can be integrally manufactured by casting or the like. Therefore, the number of components is reduced and the mounting space is further reduced.

Preferably, a lid member equipped with a bag-shaped diaphragm may be removably attached to an opening of the reserve tank while allowing an inside of the diaphragm to communicate with an ambient side.

With this structure, if the hydraulic fluid inside the reserve tank is reduced due to wear or the like of a friction pad, then the diaphragm is deformed so as to conform to variation in the amount of hydraulic fluid. This lessens fluctuation in a pressure applied on the hydraulic fluid due to bubbles of the hydraulic fluid or variation in the amount of the hydraulic fluid. At the start of the braking operation, the hydraulic fluid inside the master cylinder body is pushed back into the reserve tank through the communicating passage, which can be dealt with by contraction of the diaphragm. So, at the start of the braking operation, the brake functions slowly and impact is reduced. When the hydraulic fluid inside the master cylinder body is delivered to the caliper and the hydraulic fluid inside the reserve tank is supplied to the master cylinder body, the diaphragm is expanded to conform to a reduced volume of the hydraulic fluid. As should be appreciated, at the start of the braking operation, smooth braking is achieved by absorbing impact by repeated expansion and contraction of the diaphragm according to an increase or decrease of the hydraulic fluid inside the reserve tank. On the other hand, the diaphragm of the master cylinder device disclosed in Japanese Patent Application Publication No. Hei. 2000-255409 is incapable of being smoothly deformed so as to conform to the variation in the amount of the hydraulic fluid, and generation of bubbles of the hydraulic fluid or fluctuation in the pressure applied on the hydraulic fluid tends to occur.

Preferably, the fluid reserving portion of the reserve tank may be provided with a protrusion over an entire periphery of the fluid passing port, except for a groove. For example, a ring-shaped protrusion may be provided on a periphery of the fluid passing port and has at least one groove extending in a width direction thereof.

With this structure, when the diaphragm is expanded according to outflow of the hydraulic fluid from the reserve tank toward the master cylinder body through the fluid passing port, the fluid passing port is not fully closed by the expanded diaphragm. Specifically, with the diaphragm located close to the fluid passing port including the ring-shaped protrusion, since the hydraulic fluid flows from the fluid passing port into the communicating passage through the grooves in the protrusion, outflow of the hydraulic fluid from the reserve tank is not prevented. Further, when the hydraulic fluid is pushed back from an inside of the master cylinder body with the diaphragm expanded inside the reserve tank, the fluid flows from the fluid passing port into the reserve tank through the groove. As a result, the diaphragm is contracted. The ring-shaped protrusion may be circular and may be provided with a plurality of grooves (e.g., two to four) radially extending and circumferentially spaced from one another.

Preferably, the reserve tank may be provided with a level window on a side wall face thereof. A transparent shield plate is fitted to the level window. Through the level window, the condition of the hydraulic fluid can be checked through the level window.

Preferably, the communicating passage, the master cylinder body, and the reserve tank may be integrally cast.

The above and further objects and features of the invention will more fully be apparent from the following detailed description with accompanying drawings.

DETAILED DESCRIPTION OF THE PREFERRED EMBODIMENTS

Hereinafter, preferred embodiments of a master cylinder device for a brake of the present invention will be described with reference to the accompanying drawings.

Figure 1:
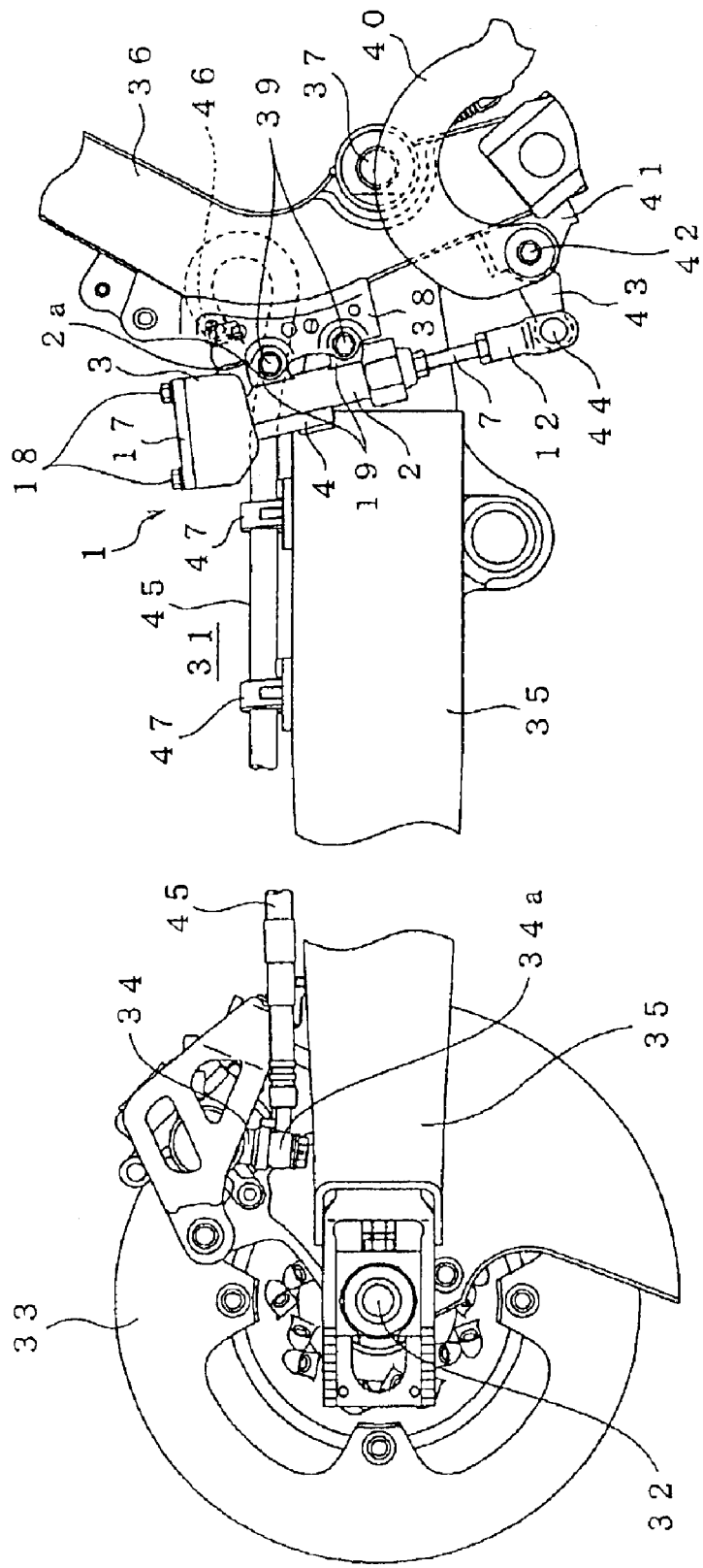
FIG. 1 is a partial right-side view showing a structure in which a rear disc brake equipped with a master cylinder device according to an embodiment of the present invention is mounted to a rear side of a motorcycle.

FIG. 1 shows a structure in which a rear disc brake having a master cylinder device according to an embodiment of the present invention is mounted on a rear side of a motorcycle, a detailed description of which will be given later.

Figure 2A:
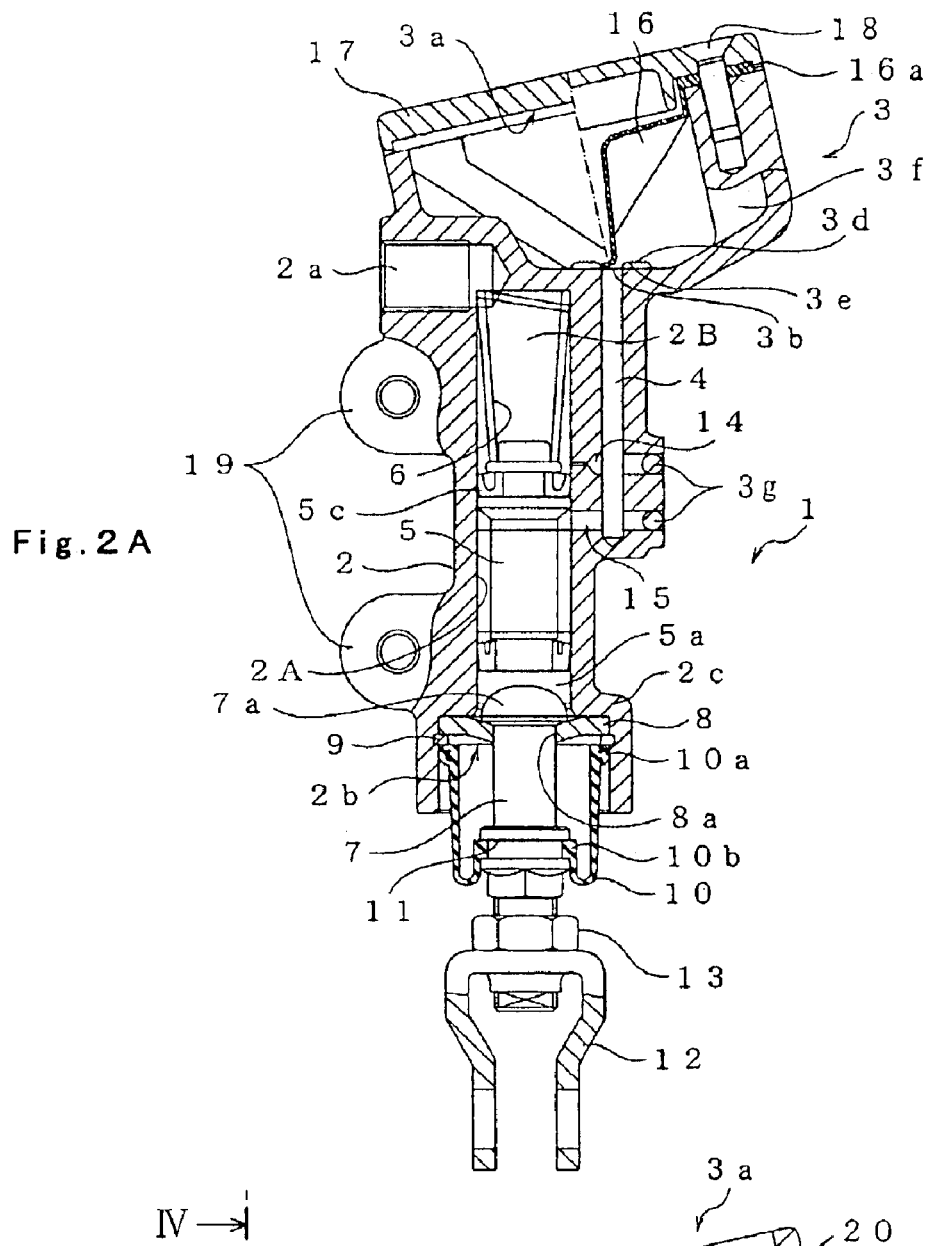
FIG. 2A is a central longitudinal sectional view showing an example of a master cylinder device according to the present invention.
Figure 2B:
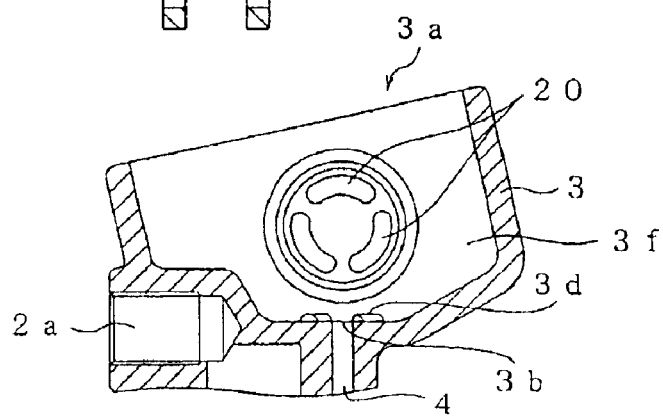
FIG. 2B is a longitudinal sectional view showing a reserve tank and its vicinity with a lid detached from the reserve tank.
Figure 3:
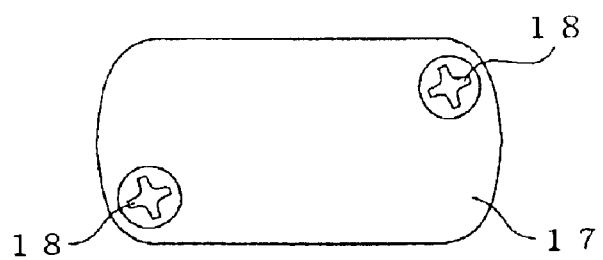
FIG. 3A is a plan view of the reserve tank in FIGS. 2A and 2B.
FIG. 3B is a plan view of the reserve tank with the lid detached therefrom.
Figure 3:
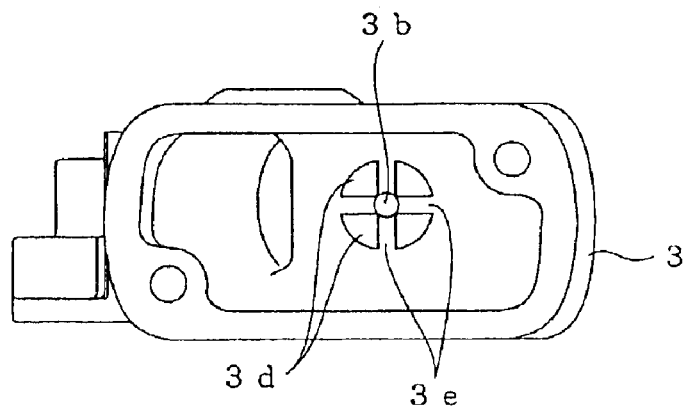
Figure 4:
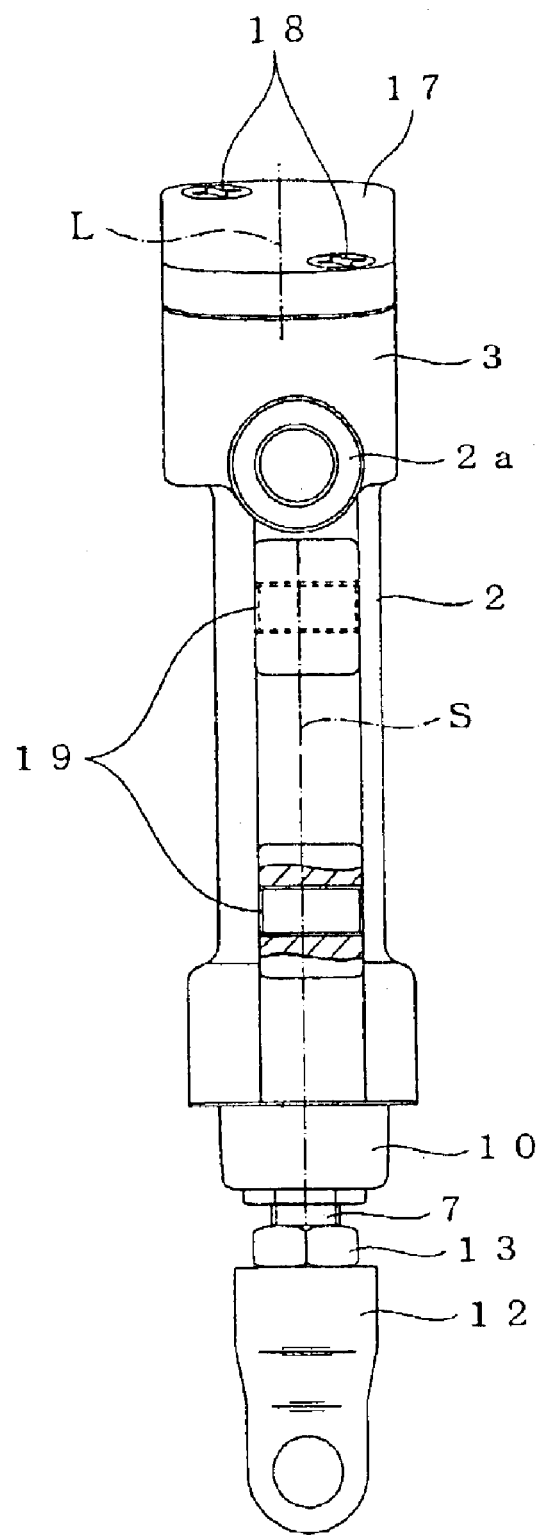
FIG. 4 is a view taken in the direction of arrows in along line IV—IV in FIGS. 2A and 2B.

As shown in FIGS. 2–4, master cylinder device 1 comprises a master cylinder body 2, a reserve tank 3, and a communication passage 4, which are integrally provided. The master cylinder body 2 is cylindrical with an open lower end. An outlet 2a of hydraulic fluid, for example, oil, is provided at an upper end portion of the master cylinder body 2 so as to open laterally. Inside the master cylinder body 2, the piston 5 is inserted to be vertically slidable along a longitudinal axis of the body 2 and is biased downwardly by a coil spring 6 mounted on the piston 5. A lower end opening 2b of the master cylinder body 2 has a diameter larger than an inner diameter of a cylinder bore 2A of the master cylinder body 2, so that a step portion 2c is provided within the opening 2b.

A lower end portion of the piston 5 has a hemispherical concave portion 5a. In addition, a rod 7 having a hemispherical head portion 7a is connected to the lower end of the piston 5 such that the head portion 7a is fitted to the concave portion 5a. With the head portion 7a of the rod 7 pivotally in contact with the lower end concave portion 5a of the piston 5, a center hole 8a of a metal annular stopper plate 8 for restricting retraction of the rod 7 is fitted to the rod 7 to allow a lower face of the head portion 7a to be supported, and the annular stopper plate 8 is engaged with the step portion 2c within the opening 2b by means of a snap ring 9. A boot 10 is externally attached to the rod 7. The boot 10 is substantially cylindrical and is fixed such that an upper end opening periphery 10a thereof is fitted to underside of the snap ring 9 within the opening 2b and a lower end opening periphery 10b thereof is fitted into an annular groove 11 provided in a periphery of a lower portion of the rod 7. A branch fitting member 12 is fitted to the lower end of the rod 7 by means of a nut 13.

As shown in FIG. 3B, the reserve tank 3 is rectangular with four round corners and laterally elongate. The reserve tank 3 is formed integrally with an upper end of the master cylinder body 2 and partially protrudes toward an opposite side of the outlet 2a. In this state, as shown in FIG. 4, a longitudinal axis L of the reserve tank 3 is substantially orthogonal to a longitudinal axis S of the master cylinder body 2. The reserve tank 3 opens at an upper end 3a thereof, which serves as an inlet 3a of the hydraulic fluid. The reserve tank 3 contains a substantially rectangular fluid reserving portion 3f. A fluid passing port 3b is provided substantially at the center portion of a bottom face of the fluid reserving portion 3f (hereinafter referred to as a bottom face of the reserve tank 3). The fluid passing port 3b has an opening area smaller than a cross-sectional area of the opening of the fluid reserving portion 3f to greatly restrict a flow cross-sectional area of the hydraulic fluid. As shown in FIGS. 2A and 2B, from the fluid passing port 3b, the communicating passage 4 extends downwardly to a vicinity of an intermediate position of the master cylinder body 2 in the vertical direction and substantially in parallel with the longitudinal direction of the master cylinder body 2.

Suitably, the fluid passing port 3b is provided at the bottom face of the reserve tank 3, but the position of the fluid passing port 3b is not intended to be limited to this. The fluid passing port 3b may be provided at any suitable location within the fluid reserving portion 3f.

A ring-shaped protrusion 3d is provided on a periphery of the fluid passing port 3b. The protrusion 3d is provided with four grooves 3e radially extending and circumferentially spaced apart from one another at intervals of 90 degrees. The protrusion 3d may be provided over the entire periphery of the fluid passing port 3b in the bottom face of the reserve tank 3 except four grooves 3e. The protrusion 3d may be substantially rectangular, or circular. The rectangular protrusion 3d is provided with at least one groove 3e in a width direction thereof.

In a wall portion of the master cylinder body 2 at a lower portion of the communicating passage 4, a relief port 14 and a supply port 15 are formed in this order from above so as to extend laterally. The supply port 15 has a diameter larger than that of the relief port 14. A cylinder bore 2A inside the master cylinder body 2 and an inside of the communicating passage 4 communicate with each other through the ports 14 and 15. The ports 14 and 15 are formed by laterally drilling a side wall of the communicating passage 4 from outside and by closing holes of the side wall by blind caps 3g. The positional relationship between the relief port 14 and the supply port 15 is set such that an upper cup seal 5c is positioned between the ports 14 and 15 when the piston 5 is under no operating pressure condition.

As shown in FIG. 2A, inside the reserve tank 3, a diaphragm 16 which is a substantially quadrangular pyramid that is pointed downwardly is mounted. An outward peripheral portion 16a at an upper end of the diaphragm 16 is secured between an upper lid 17 and an upper end wall of a peripheral wall of the reserve tank 3. Between the upper lid 17 and the peripheral portion 16a of the diaphragm 16, a portion through which an inside of the diaphragm 16 communicates with ambient side is provided (not shown). In FIG. 2A, reference numeral 18 denotes bolts for fixing the upper lid 17 of the reserve tank 3.

As shown in FIG. 2B, a side wall of the reserve tank 3 is provided with a level window 20. A transparent plastic shield plate (not shown) is fitted to the level window 20. From the level window 20, the amount of the hydraulic fluid inside the reserve tank 3 can be checked from outside.

The master cylinder device 1 structured as described above is, as shown in FIG. 1, combined with a caliper 34 in a motorcycle 31 to allow the hydraulic fluid to be delivered to the caliper 34. The caliper 34 sandwiches a brake rotor (brake disc) 33 rotating integrally with an axle 32 of the rear wheel (not shown) between brake pads (not shown), thereby pressing the brake pads against both sides of the brake rotor 33 through the use of the hydraulic fluid resistance. The caliper 34 is provided over the brake rotor 33 and mounted onto a swing arm 35 to which the rear wheel is rotatably attached. A front end portion of the swing arm 35 (on the opposite side of the rear wheel) is pivotally mounted onto a frame 36 around a pivot 37 and a rear end portion (on the rear wheel side) of the swing arm 35 is vertically pivotable.

The master cylinder device 1 is mounted to a bracket 38 welded to a rear end edge of the frame 36 at a pair of bolt flanges 19 protruded forwardly and spaced apart from each other in the vertical direction of the master cylinder body 2 by means of bolts 39. More specifically, the master cylinder device 1 is mounted such that an upper end of the reserve tank 3 is inclined slightly rearwardly and the longitudinal direction L of the reserve tank 3 corresponds with the longitudinal direction of the motorcycle 31. In this mounted state, an upper surface of the reserve tank 3 becomes substantially horizontal by inclining the longitudinal axis (longitudinal axis S) of the master cylinder body 2 rearwardly. At a rear end of the frame 36 immediately below the pivot 37, a rear end portion of a brake pedal arm 40 is rotatably supported through a bracket 41 and a pivot bottle 42. An operation portion 43 is protruded rearwardly from the brake pedal arm 40. A lower end portion of the fitting member 12 is pivotally mounted to the operation portion 43 around a connecting pin 44. In this structure, upon a driver applying a force on the brake pedal arm 40, the rod 7 is pushed up.

With the master cylinder device 1 mounted on the motorcycle 31, the outlet 2a of the master cylinder body 2 is directed forwardly. So, as shown in FIG. 1, the rubber brake hose 45 is connected at one end to the outlet 2a by means of a plate bolt 46 or the like and bent in a circle shape in the vicinity of the outlet 2a. The brake hose 45 is led rearwardly along the swing arm 35 to the caliper 34 so as to be fixed by a plurality of guides 47 and is connected at the other end thereof to a coupling 34a of the caliper 34.

By mounting the master cylinder device 1 to the motor cycle 31 as described above, a disc brake mechanism fully functions. In accordance with the disc brake mechanism, upon the driver applying a force on a front pedal (not shown) of the brake pedal arm 40 to start a braking operation, thereby causing the rod 7 to be pushed up, the piston 5 inside the master cylinder body 2 moves upward against a force exerted by the coil spring 6. A hydraulically operated chamber 2B is defined between a tip end of the piston 5 and a bottom portion of the cylinder bore 2A and is connected to the reserve tank 3 through the relief port 14. In the course of pushing up the rod 7, when the cup seal Sc provided on the piston 5 passes through the relief port 14, the hydraulically operated chamber 2B is disconnected from the reserve tank 3 and a volume of the chamber 2B is contracted, thereby generating an operating pressure. As a result, the hydraulic fluid inside the master cylinder body 2 is pressurized and is delivered from the outlet 2a to the caliper 34. At the time when the pressure of the hydraulic fluid is lowered between the master cylinder body 2 and the caliper 34, the cup seal Sc is inclined, thereby causing the hydraulic fluid to flow from the supply port 15 into the master cylinder body 2 through a back face of the cup seal Sc. On the other hand, the hydraulic fluid delivered to the caliper 34 closes the caliper 34 to cause the brake pads (not shown) to apply the pressure to the brake rotor 33 from both sides. As a result, the brake functions. It should be appreciated that, at the start of the braking operation, the brake functions slowly, because the hydraulic fluid inside the master cylinder body 2 is partially delivered toward the reserve tank 3 through the relief port 14, and thereby rapid operation of the caliper 34 is prevented.

Even when the hydraulic fluid inside the reserve tank 3 is reduced due to wear or the like of a friction pad (not shown), the diaphragm 16 is smoothly deformed so as to conform to variation in a liquid level of the hydraulic fluid to compensate for the decrease in the hydraulic fluid. Therefore, it is possible to suppress fluctuation in the pressure applied on the hydraulic fluid which would be caused by bubbles of the hydraulic fluid or variation in the amount of the hydraulic fluid, due to oscillation of the vehicle body, or the like.

The hydraulic fluid inside the reserve tank 3 sometimes suctions air and generates bubbles inside the reserve tank 3 due to oscillation or the like of the vehicle body during traveling of the motorcycle 31. However, these bubbles are inhibited from entering the communicating passage 4, because the opening area of the fluid passing port 3b at the center of the bottom face of the tank 3 is much smaller than the transverse sectional area of the opening of the fluid reserving portion 3f of the reserve tank 3 and the diameter of the communicating passage 4 located below the fluid passing port 3b is small. As a result, the bubbles are inhibited from entering the master cylinder body 2 through the communicating passage 4. This is because the fluid passing port 3b and the communicating passage 4 function as a fluid separator and therefore, the fluid separator can be dispensed with.

Since the diameter of the fluid passing port 3b is restricted to prevent entry of the bubbles into the communicating passage 4, the expanded diaphragm 16 would close the fluid passing port 3b. But, the fluid passing port 3b is not fully closed because the hydraulic fluid flows through the plurality of grooves 3e circumferentially spaced in the ring-shaped protrusion 3d on the periphery of the fluid passing port 3b.

Further, as can be clearly seen from FIG. 2, the reserve tank 3 is located on the longitudinal upper end of the master cylinder device 1. Thus, an increase or decrease in the volume of the hydraulic fluid inside the tank 3 according to the relationship with the caliper 34 is easily achieved by changing the depth of the reserve tank 3.

In this embodiment, the master cylinder device 1, including the communicating passage 4, are integrally cast. Alternatively, the master cylinder body 2 and the reserve tank 3 may be integrally molded and then connected to each other through a communicating passage comprised of a rubber hose or the like.

Instead of a rear-side disc brake, the master cylinder device 1 may be applied to a front-side disc brake.

The reserve tank 3 may have a cross section of an ellipsoid shape or an oval shape so as conform in width to the master cylinder body 2.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embodied by the claims.

What is claimed is:

1. A master cylinder device for a brake comprising:
    a master cylinder body formed along a longitudinal axis, the master cylinder body having an upper end and a lower end, and a cylindrical cylinder bore formed in the master cylinder body such that the cylinder bore opens to the lower end, the master cylinder body being oriented such that the longitudinal axis is substantially vertical;
    a reserve tank provided integrally with the master cylinder body so as to have a fluid reserving portion for feeding hydraulic fluid for the brake;
    a fluid passing port provided in the fluid reserving portion of the reserve tank, the fluid passing port having an opening area smaller than an opening cross-sectional area of the fluid reserving portion; and
    a communicating passage connecting the fluid passing port to the cylinder bore, wherein the communicating passage is formed on the side portion of the master cylinder body to extend substantially in parallel with an axis of the master cylinder body and configured to open into the reserved tank;
    wherein the reserve tank is disposed on an upper end of the master cylinder body; and
    wherein a piston is provided in the cylinder bore of the master cylinder body, and the piston is configured to be vertically slidable along the longitudinal axis of the master cylinder body within the cylinder bore.

2. The master cylinder device for a brake according to claim 1, wherein the communicating passage is provided integrally with the master cylinder body and the reserve tank.

3. The master cylinder device for a brake according to claim 2, wherein the communicating passage, the master cylinder body, and the reserve tank are integrally cast.

4. The master cylinder device for a brake according to claim 1, wherein a lid member equipped with a bag-shaped diaphragm is removably attached to an opening of the reserve tank to allow an inside of the diaphragm to communicate with ambient side.

5. The master cylinder device for a brake according to claim 1, wherein the reserve tank is provided with a level window on a side wall face thereof.

6. The master cylinder device according to claim 1, further comprising:
    a fluid feed passage connected to the communicating passage and configured to open into the master cylinder body in a direction to form a right angle with respect to the axis of the master cylinder body, wherein an inside of the reserve tank and an inside of the cylinder fluidically communicate with each other through the communicating passage and the fluid feed passage.

7. The master cylinder device according to claim 6, wherein a center axis of the reserve tank in the axial direction of the master cylinder body is eccentric with the axis of the master cylinder body as seen in a plan view.

8. The master cylinder device according to claim 7, wherein the center axis of the reserve tank is inclined with respect to the axis of the master cylinder body.

9. The master cylinder device according to claim 8, wherein an upper surface of the reserve tank is substantially horizontal with the master cylinder body mounted to be inclined rearward.

10. A master cylinder device for a brake, comprising:
    a master cylinder body having a cylinder bore;
    a reserve tank provided integrally with the master cylinder body so as to have a fluid reserving portion for feeding hydraulic fluid for the brake;
    a fluid passing port provided in the fluid reserving portion of the reserve tank, the fluid passing port having an opening area smaller than an opening cross-sectional area of the fluid reserving portion; and
    a communicating passage connecting the fluid passing port to the cylinder bore;
    wherein the reserve tank is provided on an upper end of the master cylinder device such that a longitudinal direction of the reserve tank is substantially orthogonal to a longitudinal axis of the master cylinder body;
    wherein a lid member equipped with a bag-shaped diaphragm is removably attached to an opening of the reserve tank to allow an inside of the diaphragm to communicate with ambient side; and wherein the fluid reserving portion of the reserve tank is provided with a protrusion over an entire periphery of the fluid passing port, except for a groove.

11. A master cylinder device for a brake, comprising:

a master cylinder body having a cylinder bore;

a reserve tank provided integrally with the master cylinder body so as to have a fluid reserving portion for feeding hydraulic fluid for the brake;

a fluid passing port provided in the fluid reserving portion of the reserve tank, the fluid passing port having an opening area smaller than an opening cross-sectional area of the fluid reserving portion; and a communicating passage connecting the fluid passing port to the cylinder bore;

wherein the reserve tank is provided on an upper end of the master cylinder device such that a longitudinal direction of the reserve tank is substantially orthogonal to a longitudinal axis of the master cylinder body;

wherein a lid member equipped with a bag-shaped diaphragm is removably attached to an opening of the reserve tank to allow an inside of the diaphragm to communicate with an ambient side; and wherein a ring-shaped protrusion is provided on a periphery of the fluid passing port and has at least one groove extending in a width direction thereof.

12. A master cylinder device for a brake, comprising:

a master cylinder body having a cylinder bore;

a reserve tank provided integrally with the master cylinder body so as to have a fluid reserving portion for feeding hydraulic fluid for the brake;

a fluid passing port provided in the fluid reserving portion of the reserve tank, the fluid passing port having an opening area smaller than an opening cross-sectional area of the fluid reserving portion; and a communicating passage connecting the fluid passing port to the cylinder bore;

wherein the reserve tank is provided on an upper end of the master cylinder device such that a longitudinal direction of the reserve tank is substantially orthogonal to a longitudinal axis of the master cylinder body;

wherein a lid member equipped with a bag-shaped diaphragm is removably attached to an opening of the reserve tank to allow an inside of the diaphragm to communicate with ambient side; and wherein the ring-shaped protrusion is circular and is provided with a plurality of grooves radially extending and circumferentially spaced apart from one another.

* * * * *

UNITED STATES PATENT AND TRADEMARK OFFICE
CERTIFICATE OF CORRECTION

PATENT NO. : 6,907,732 B2  
APPLICATION NO. : 10/407581  
DATED : June 21, 2005  
INVENTOR(S) : Yoshihiro Masuda and Koji Inoue It is certified that error appears in the above-identified patent and that said Letters Patent is hereby corrected as shown below:

Title Page, Item (73) Assignee: add Line 2 --Nissin Kogyo Co., Ltd.--.

Signed and Sealed this

Eleventh Day of November, 2008

JON W. DUDAS  
*Director of the United States Patent and Trademark Office*